United States Patent [19]

Kappius

[11] 3,805,131

[45] Apr. 16, 1974

[54] ELECTRICAL DRIVE ARRANGEMENT FOR REWINDING EQUIPMENT

[75] Inventor: Friedrich Kappius, Nurnberg-Eibach, Germany

[73] Assignee: Siemens Aktiengesellschaft, Berlin, Germany

[22] Filed: Oct. 1, 1971

[21] Appl. No.: 185,570

[30] Foreign Application Priority Data

July 22, 1971 Germany .......................... 1236684

[52] U.S. Cl. .................................. 318/77, 318/327

[51] Int. Cl. ............................................ H02p 5/46

[58] Field of Search ................................ 318/66–68, 318/77, 6, 7, 326, 327, 138, 54–56

[56] References Cited

UNITED STATES PATENTS

| | | | |
|---|---|---|---|
| 3,704,401 | 11/1972 | Miller | 318/7 |
| 3,715,641 | 2/1973 | Mattes | 318/7 |
| 3,746,278 | 7/1973 | Dennis | 318/7 |
| 3,600,654 | 8/1971 | Yasutake | 318/6 |
| 3,594,620 | 7/1971 | Husted | 318/7 |
| 3,290,572 | 12/1966 | Hartmann | 318/326 |
| 3,504,252 | 3/1970 | Moczala | 318/138 |

*Primary Examiner*—Bernard A. Gilheany
*Assistant Examiner*—Thomas Langer
*Attorney, Agent, or Firm*—Herbert Lerner

[57] ABSTRACT

In an electrical drive arrangement for rewinding equipment or a rewinding device, the unwinding or supply reel is driven by a reel motor and the take-up or winding reel is driven by a reel motor. The reel motors are controlled by speed. A speed regulating device which may be selectively connected by a first selector switch to one of the two reel motors is provided in common for both reel motors. During the rewinding of the wound material, the rotary speed of the motor of the take-up reel is controlled in accordance with the speed of the supply reel.

5 Claims, 2 Drawing Figures

1

ELECTRICAL DRIVE ARRANGEMENT FOR REWINDING EQUIPMENT

Figure 1:
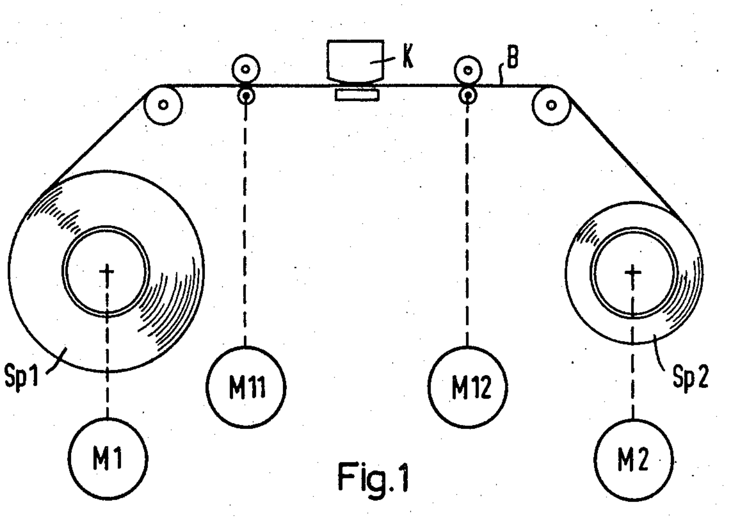

The invention relates to an electrical drive arrangement for rewinding equipment. More particularly, the invention relates to an electrical drive arrangement for rewinding equipment in which each of the supply reel and the take-up reel of the equipment is driven by a reel motor.

Such drive arrangements are used particularly for magnetic tape cassette equipments of data processing machines.

The known drive arrangements for magnetic tape cassette equipment always have a controlled individual drive for both reels. The problem is to keep the rewinding time for the magnetic tape as short as possible, for which reason correspondingly high tape velocities are required for a given length of tape. In rewinding the magnetic tape, the speed of the supply or unwinding reel increases for constant speed of the winding or take-up reel, or also when the tape velocity is controlled to be constant, according to the decreasing radius and, at the end of the rewinding process, reaches its highest value. For braking the unwinding reel, a correspondingly long braking time is therefore required and a corresponding length of tape must be allowed as the braking distance ahead of the end of the tape. In the known drive arrangements, the cost for braking the rapidly rotating supply reel and for regulating the tape velocity or the speed of the take-up reel to be constant is accordingly high.

An object of the invention is to provide an electrical drive arrangement for rewinding equipment which overcomes the disadvantages of known equipment of similar type.

Another object of the invention is to provide an electrical drive arrangement for rewinding equipment which functions with a reduced expenditure for regulating and braking the reel motors.

Still another object of the invention is to provide an electrical drive arrangement for rewinding equipment which is simple in structure, but effective, efficient and reliable in operation.

In an electrical drive arrangement of the aforedescribed type, the indicated problem is solved by providing for both reel motors a common speed control device which can be connected to one of the two reel motors by means of a first switch. For rewinding the wound material, the speed of the motor of the take-up winding is regulated as a function of the speed of the supply winding.

A specially simple drive arrangement is obtained in accordance with another embodiment of the invention by providing, in a manner known per se, a current proportional to the speed. The current is coupled out of the winding branches of the reel motors and is fed to the speed control arrangement via a second switch. Furthermore, effective braking of the reel motors is achieved by the short-circuiting of the winding branches of the two reel motors. The formation of loops, which may occur in rewinding due to the non-uniform running of the take-up reel, is prevented in a simple manner by providing a load resistance between the second switch and the Y-junction of the winding branches.

The electrical drive arrangement for rewinding equipment includes a supply reel, a first speed-controlled motor coupled to and driving the supply reel, a take-up reel, a second speed-controlled motor coupled to and driving the take-up reel and winding material wound on the reels and extending from one of the reels to the other.

In accordance with the invention, the electrical drive arrangement comprises a speed control circuit for controlling the first and second motors, the speed of the motor of the take-up reel being controlled as a function of the speed of the supply reel for rewinding the winding material. A first switch couples the speed control circuit to the first and second reel motors for selectively connecting one of the reel motors to the speed control circuit.

Each of the first and second reel motors has a plurality of winding branches. The winding branches provide a current proportional to the speed of the corresponding motor. A second switch connected between the winding branches of the first and second reel motors and the speed control circuit supplies the current to the speed control circuit.

A first short-circuit switch connected between the first switch and the speed control circuit short-circuits the winding branches of the first and second reel motors. The winding branches of the first and second reel motors are connected to a common junction point. A load resistor is connected between the common junction point and the second switch. A second short-circuit switch is connected in shunt with the load resistor.

Figure 2:
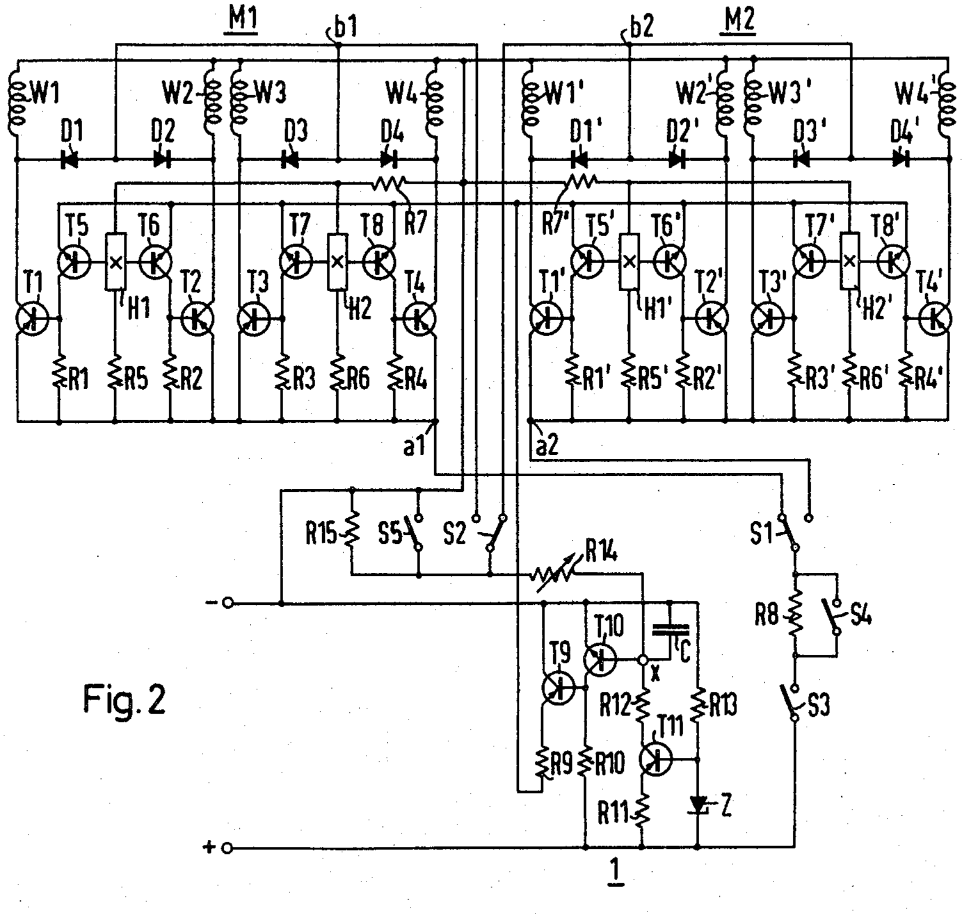

In order that the invention may be readily carried into effect, it will now be described with reference to the accompanying drawing, wherein:

Fig. 1 is a schematic diagram of an embodiment of magnetic tape cassette equipment; and FIG. 2 is a circuit diagram of the electrical drive arrangement of the invention, illustrating the two reel motors and the speed control arrangement.

In FIG. 1, a reel motor M1 drives a reel Sp1 and a reel motor M2 drives a reel Sp2. During write or read operation, the tape tension is controlled via the reel motors M1 and M2, and in the case of rewinding, the rewind speed. During write or read operation, the drive of a magnetic tape B is effected by two capstan motors M11 and M12. A recording or pickup head K is provided in operative proximity with the magnetic tape equipment.

FIG. 2 is the electric circuit diagram of the two reel motors M1 and M2, which are DC motors without commutators. The same reference numerals are used for the corresponding parts of the two reel motors M1 and M2 except that one set of such numerals are primed. The stator winding or the motor M1 has four winding branches or circuits W1, W2, W3 and W4, and the stator winding of the motor M2 has four winding branches or circuits W1', W2', W3' and W4'. At one end, the four winding branches are connected to each other in a Y-junction and are connected to the negative polarity terminal − of a DC voltage source.

The winding branches W1 to W2 and W1' to W4' are connected in series with power transistors T1 to T4 and T1' to T4'. That is, the winding branch W1 is connected to the collector electrode of the transistor T1, the winding branch W2 is connected to the collector electrode of the transistor T2, the winding branch W3 is connected to the collector electrode of the transistor T3, the winding branch W4 is connected to the collector electrode of the transistor T4, the winding branch W1′ is connected to the collector electrode of the transistor T1′, and so on.

The emitter electrodes of the power transistors T1 to T4 are connected to each other at an emitter junction point a1 and the emitter electrodes of the power transistors T1′ to T4′ are connected to each other at an emitter junction point a2. A first switch S1 is utilized to connect the emitter junction points a1 and a2 of the two reel motors selectively to a series resistor R8, which can be connected via a main switch S3 to the positive polarity terminal + of the DC voltage source. A shorting switch S4 is connected across the series resistor R8.

The power transistors T1 to T4 are controlled by input transistors T5 to T8 and the power transistors T1′ to T4′ are controlled by input transistors T5′ to T8′. To accomplish this, the base electrodes of the input transistors T5 and T6 are connected to the Hall electrodes of a Hall generator H1 and the base electrodes of the input transistors T7 and T8 are connected to the Hall electrodes of a Hall generator H2. One control current terminal of the Hall generators H1 and H2 is connected via a resistor R5 and R6, respectively, to the emitter junction point and the other control current terminal of said Hall generators is connected via a common resistor R7 to the negative polarity terminal of the DC voltage source.

The input transistors T5 to T8 are controlled by the Hall generators H1 and H2 in accordance with the position of the permanent magnet rotor of a corresponding one of the reel motors M1 and M2. The collector electrode of the input transistor T5 is connected to the base electrode of the power transistor T1, the collector electrode of the transistor T6 is connected to the base electrode of the power transistor T2, the collector electrode of the transistor T7 is connected to the base electrode of the power transistor T3, the collector electrode of the transistor T8 is connected to the base electrode of the power transistor T4, and so on.

The collector electrodes of the input transistors T5 to T8 are connected in common via collector resistors R1, R2, R3 and R4, respectively, to the emitter junction point of the power transistors T1 to T4. The emitter electrodes of the input transistors T5 to T8 and T5′ to T8′ of the reel motors M1 and M2, respectively, are connected via a common control resistor R9 and a common control transistor T9 to the negative polarity terminal of the DC voltage source.

The collector electrode of a control transistor T10 is directly connected to the base electrode of the control transistor T9, and is connected to the negative polarity terminal of the DC voltage source via a first collector resistor. The emitter electrode of the control transistor T10 is connected to the positive polarity terminal of the DC voltage source. The base electrode of the control transistor T10 is connected to a junction point $x$, via a second collector resistor R12, to the collector electrode of a transformation transistor T11, via a capacitor C, to the negative polarity terminal of DC voltage source, and via a variable resistor R14, to a second switch S2.

The emitter electrode of the transformation transistor T11 is connected, via an emitter resistor R11, to the positive polarity terminal of the DC voltage source. The base electrode of the transformation transistor T11 is connected to a common junction point in the series connection of a Zener diode Z and a resistor R13. The series circuit arrangement of the Zener diode Z and the resistor R13 is connected to the DC voltage source in such a manner that the cathode of the Zener diode is connected to the positive polarity terminal of the DC voltage source.

The control transistor T9, the control transistor T10 and the transformation T11, and the resistors R9, R10, R11, R12 and R13 and the Zener diode Z, together form a speed control device 1.

The variable resistor R14, which is connected at one end, via the junction point $x$, to the base electrode of the control transistor T10, is selectively connected at its other end, via the second switch S2, to common junction points b1 and b2. The common junction point b1 is connected to the anode of each of a plurality of diodes D1, D2, D3 and D4, and the common junction point b2 is connected to the anode of each of a plurality of diodes D1′, D2′, D3′ and D4′. The cathode of the coupling diode D1 is connected to the winding branch W1, the cathode of the coupling diode D2 is connected to the winding branch W2, the cathode of the coupling diode D3 is connected to the winding branch W3, the cathode of the coupling diode D4 is connected to the winding branch W4, the cathode of the coupling diode D1′ is connected to the winding branch W1′, and so on. The cathode of each coupling diode D1 to D4 and D1′ to D4′ is connected to the end of the corresponding winding branch which is connected to the corresponding power transistor.

A load resistor R15 is connected in parallel with a second shorting switch S5 and the parallel circuit R15, S5 is connected between the end of the variable resistor R14 at the second switch S2 and the negative polarity terminal of the DC voltage source.

The operation of the main switch S3 and the first switch S1 selectively connects one of the two emitter junction points a1 and a2 to the positive polarity terminal of the DC voltage source, via the first shorting switch S4, which is closed during the rewind operation. The emitter junction point is thus connected to a source of voltage in correspondence with the position of the first switch S1 shown in FIG. 2.

The Hall generators H1 and H2 connected via the resistors R5 and R6, and R5′ and R6′, respectively, to the emitter junction point a1 then control, via the input transistors T5 to T8 and T5′ to T8′, respectively, the power transistors T1 to T4 and T1′ to T4′, respectively, in the corresponding order, so that the current flows through the winding branches W1 to W4 sequentially and the permanent magnet rotor of the reel motor M1 begins to rotate. Since both reel motors M1 and M2 are coupled to each other via the magnetic tape B, the reel motor M2 also rotates. The magnetic field of the permanent magnet rotor of the reel motor M2 induces a voltage proportional to the speed of rotation in its winding branches W1′ to W4′.

A current driven by the induced voltage is taken off by the coupling diodes D1′ to D4′ and fed, via the second switch S2 and the variable resistor R14, to the base electrode of the control transistor T10, as the actual value of the speed. A defined current is fed via the second collector resistor R12 as the reference value to the base electrode of the control transistor T10 from the transformation T11. The reference value current is proportional to the reference voltage applied to the base electrode of the transformation transistor T11 via the Zener diode Z.

The actual and reference values are therefore compared at the base electrode of the control transistor T10, and said control transistor is controlled in accordance with the deviation between the reference and the actual values. The control transistor T10 in turn controls the control transistor T9, which again controls the input transistors T5 to T8 and thereby the power transistors T1 to T4.

The first and second switches S1 and S2 are coupled to each other in such a way that they always occupy opposite switch positions. That is, if the first switch S1 connects the emitter junction point a1 of the reel motor M1 to the resistor R8, the common junction point b2 is then connected via the second switch S2 of the coupling diodes D1' to D4' of the reel motor M2 to the variable resistor R14.

In the drive arrangement of the invention, the speed of the supply reel can therefore be adjusted to a value which is favorable for braking. In contrast with the known drive arrangements, in which the initial speed of the take-up reel is limited to a correspondingly low value in consideration of the increasing speed of the supply reel, the initial speed can be high, in the drive arrangement according to the invention. Thus, overall, a shortening of the rewind time is achieved.

During the rewind process, the second shorting switch S5 is opened, so that the load resistor R15 shunted across it becomes effective. The circuit of the winding branches W1' to W4' of the unwinding reel motor M2 is closed via the load resistor R15. A braking moment is generated by the current flowing in this circuit, so that the magnetic tape is always under slight tension during the rewinding and the formation of loops or other irregularities are avoided during the rewinding. Shortly before the end of the rewinding process, the second shorting switch S5 is closed and the circuit of the winding branches W1' to W4' is thereby short-circuited. Thus, the maximum braking force then becomes effective and the supply reel is braked reliably in the the predetermined short time.

In the aforedescribed manner, the speed control device 1 is always fed an actual speed value which corresponds to the speed of the supply reel, in the rewind operation. At the beginning of the rewinding process, when the take-up reel is still empty, and therefore the diameter of tape B on it is still small, the supply reel rotates correspondingly slowly. At first, the actual speed value derived from the supply reel can be below the preset reference value. This has the result that the control transistor T9 and, therefore, ultimately the power transistors T1 to T4, are fully modulated, so that the motor of the take-up reel runs at maximum speed. The maximum speed is determined by the applied DC voltage.

Because of the increasing diameter of the take-up reel, the supply reel turns faster and faster. As soon as the supply reel reaches the reference speed, speed control is instituted. If the actual value of the speed exceeds the reference value, the control transistor T10 and therefore also, via the control transistor T9 and the input transistors T5 to T8, the power transistors T1 to T4, are regulated down. The speed of the supply reel therefore no longer increases, but remains constant to the end of the rewinding process at the value of the preset reference value.

Since the speed of the supply reel is held constant, advantages are also obtained in the so-called search operation mode. The braking distance is also constant over a wide range of the rewinding operation because of the constant speed of the supply reel, and the finding of a particular point on the magnetic tape is thereby facilitated.

During read or write operation, the running speed of the magnetic tape is determined by the capstan motors M11 and M12. One of the capstan motors drives the magnetic tape B in accordance with the direction of motion of said tape. One of the two reel motors M1 and M2 is connected to the source of voltage in accordance with the direction of motion by opening the first shorting switch S4, via the resistor R8. The reel motor in question therefore runs, in the read or write operation mode, at low speed and generates the tape tension necessary for winding up the tape.

The control transistor T10 is fully modulated in the read or write operation mode, since the actual speed value is considerably below that of the speed reference value set for rewind operation. The input transistors T5 and T8 and the power transistors T1 to T4 are also fully modulated during the read or write operation via the control transistor T9. In this mode of operation, the current in the winding branches W1 to W4 is essentially determined by the resistor R8, so that the respectively connected reel motor M1 or M2 runs at a constant torque. This torque is in the order of magnitude of the starting torque because of the low speed, and accelerates the take-up reel when the equipment is switched to read or write operation. The acceleration is so great that only a small tape loop is generated.

As shown in the illustrated embodiment of the electrical drive arrangement of the invention, a single speed control is sufficient in said drive arrangement. A suitable choice of the initial speed of the take-up reel provides a shorter rewind time in an advantageous manner.

In the drive arrangement of the invention, electronic switching elements may be used instead of the mechanical switches While the invention has been described by means of a specific example and in a specific embodiment, I do not wish to be limited thereto, for obvious modifications will occur to those skilled in the art without departing from the spirit and scope of the invention.

I claim:

1. An electrical drive arrangement for rewinding equipment having a supply reel and a take-up reel and winding material wound on the reels and extending from one of the reels to the other, both of the reels being driven by respective speed-controlled motors, comprising a common rotary speed regulating arrangement for both motors and having an input and an output; means to provide a speed reference signal; said speed regulating arrangement having its output connected to a first switch means connectible to the take-up reel during rewind of the winding material; each of the motors having means for sensing actual rotary speed of the respective motor; and second switch means for connecting the respective actual speed sensing means of the supply motor to said speed reference signal at said input of the rotary speed regulating arrangement during rewind to determine the actual rotary speed of the corresponding take-up reel motor.

2. An electrical drive arrangement as claimed in claim 1, wherein each of the first and second motors has a plurality of winding branches, and the second switch means has a first fixed contact, a second fixed contact and a movable contact, and further comprising coupling diodes connected to the winding branches of the first motor and coupling diodes connected to the winding branches of the second motor, the coupling diodes of the first motor having a common-connected electrode connected to the one fixed contact of the second switch means, the coupling diodes of the second motor having a common-connected electrode connected to the second fixed contact of the second switch means, and the speed-regulating circuit having an actual magnitude input for receiving the actual magnitude of the speed of rotation connected to the movable contact of the second switch means.

3. An electrical drive arrangement as in claim 2 further comprising a short circuit switch having one contact connected to both neutral points of the winding branches, and another contact connected to the movable contact of the second switch.

4. An electrical drive arrangement as claimed in claim 2, wherein the winding branches of both motors are connected to a common junction point and further comprising a load resistor having one terminal connected to the common junction point of the windings and its other terminal connected to the movable contact of the second switch.

5. An electrical drive arrangement as claimed in claim 4, further comprising a short-circuit switch connected in shunt with the load resistor.

* * * * *

UNITED STATES PATENT OFFICE

CERTIFICATE OF CORRECTION

PATENT NO. : 3,805,131

DATED : April 16, 1974

INVENTOR(S) : FRIEDRICH KAPPIUS

It is certified that error appears in the above-identified patent and that said Letters Patent are hereby corrected as shown below:

In the heading to the printed specification, line 10,

"July 22, 1971 Germany 1236684" should read

--July 22, 1971 Germany P 21 36 684.7--.

Signed and sealed this 10th day of June 1975.

(SEAL)
Attest:

RUTH C. MASON
Attesting Officer

C. MARSHALL DANN
Commissioner of Patents
and Trademarks